Aug. 19, 1969         F. X. CHEVRIER         3,462,101
PARACHUTE RIPCORD
Filed March 13, 1968
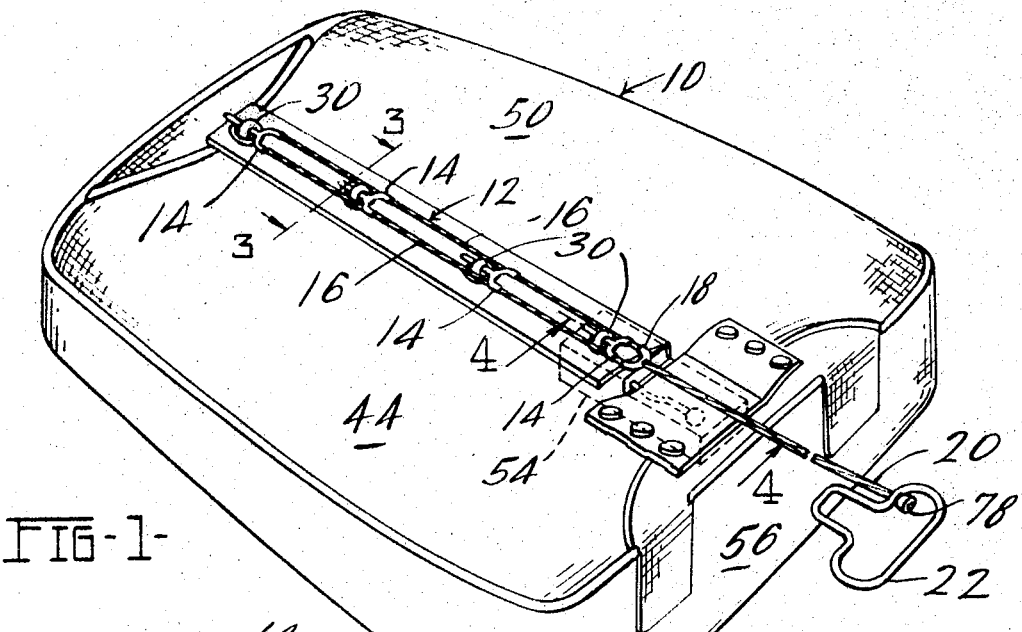
FIG-1-
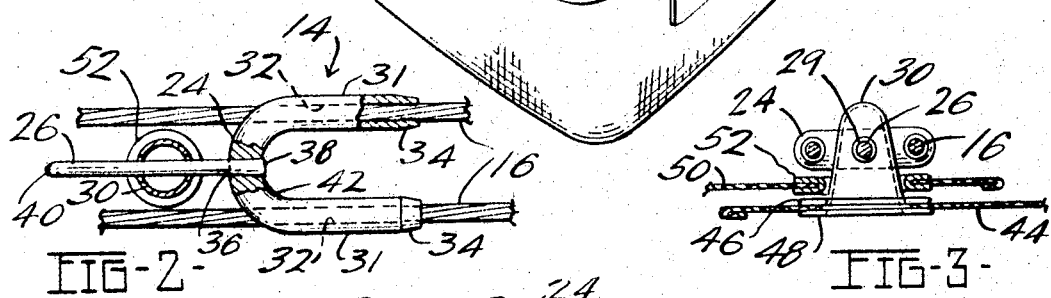
FIG-2-
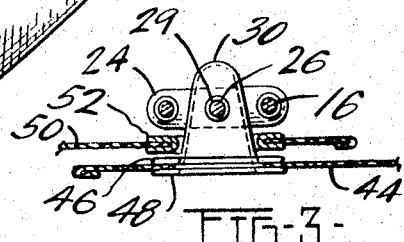
FIG-3-
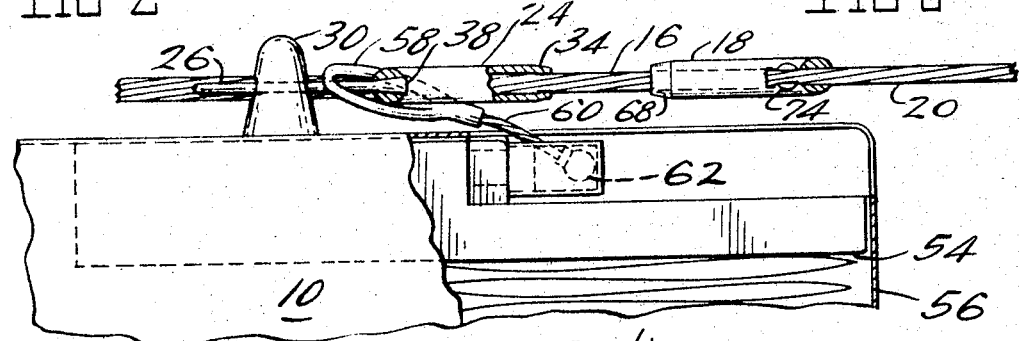
FIG-4-
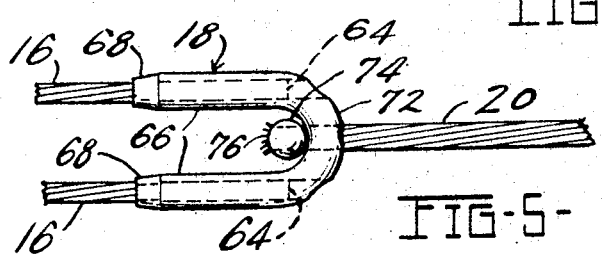
FIG-5-
INVENTOR:
FRANCOIS X. CHEVRIER.
BY
ATT'YS 3,462,101
PARACHUTE RIPCORD
Francois X. Chevrier, Santa Ana, Calif., assignor to Hi-Tek Corporation, Santa Ana, Calif., a corporation of California
Filed Mar. 13, 1968, Ser. No. 712,686
Int. Cl. B64d *17/52;* A44b *17/00, 19/00*
U.S. Cl. 244—148                                    7 Claims

ABSTRACT OF THE DISCLOSURE

A safe parachute ripcord including serial release pins connected to two parallel release cables. The parachute pack is fitted with spaced, apertured locking posts or cones adapted to receive grommets attached to the closure flaps of the pack. Each release pin includes a generally U-shaped bail-like body having hollow sides and a connecting center portion and a locking pin. The locking pin, which is fixed to the center bight portion of the body, is adapted to fit through the aperture on the locking post to lock the grommets onto the locking posts. The hollow sides of the body are adapted to receive, and to be fastened to, the two parallel release cables. The release pins are placed on the cables at the spacing of the locking posts. One of the U-shaped bodies, without the locking pin, is connected to the ends of the parallel cables, and a single release cable is attached to its center portion. The single release cable is attached to a hand grip for manual operation.

Background of the invention

This invention relates generally to an improved parachute ripcord, and particularly to an improved release pin for a parachute ripcord.

At the present time, parachute ripcords usually include a number of release pins serially connected on a single cable. Each release pin has a straight, hollow body and a locking pin angularly attached thereto. In assembling the ripcord, the cable is threaded through the hollow bodies of the release pins. The pins are spaced on the cable at the spacing of cooperating locking posts on the parachute pack and are crimped or swaged in place, and a hand grip for manual operation is attached to the free end of the cable, or the cable is connected to an automatic actuator.

The primary problem with the present ripcords is that a strong force is needed to pull the locking pins from their cooperating locking posts. Commercial and military ripcords are constructed from a number of fittings spaced along a single cord as shown in Bratz Patent 2,398,692, issued Apr. 16, 1946. Each of the Bratz fittings has a hollow body adapted to receive the single cord and a locking pin extending at an angle from the body. The angle between the locking pin and the cable has to be sufficiently large for the cable to clear the locking post. However, this angle inherently increases the force required to pull the ripcord. There is a danger to the parachutist that the automatic actuator associated with the parachute pack will not develop a sufficient force to pull the rip cord.

There is also a danger of the single cable in the present ripcord fraying. A frayed cable is not always apparent to the parachute packer and may be used even though it is unsafe. If even a single locking pin remains in its cooperating locking post because the cable has broken, the parachute will not be released when the ripcord is pulled.

Summary of the invention

The ripcord of the present invention has two parallel cables connected to serially related release pins. The release pins are spaced on the cables at the spacing of their cooperating locking posts such that, as the ripcord is pulled, the release pins simultaneously disengage the locking posts causing the parachute pack closure flaps to open. With two cables connected between the serial release pins, the parachute will open even though one of the cables has broken.

Each release pin has a generally U-shaped body with hollow, parallel side portions and a locking pin adapted to fit into an aperture in a cooperating locking post. The hollow side portions of the body are adapted to be received by, and to be crimped or swaged onto, the parallel cables.

An actuator is connected to the first of the serially connected release pins, such that when it is actuated, all of the release pins are pulled. The ends of the two parallel cables adjacent to the first of the serial release pins are terminated in a U-shaped bracket, which is connected to a single cable used for manually opening the parachute.

Accordingly, it is the primary object of this invention to provide an improved release pin for use in parachute ripcords.

It is another object of this invention to provide an efficient parachute ripcord assembly having serial locking pins which are parallel to the ripcord cable.

Still another object of this invention is to provide a safe parachute ripcord that will open a parachute even though one ripcord is frayed or broken.

Other objects and advantages of the invention will become apparent in the following detailed description of a preferred form thereof, reference being had to the accompanying drawings.

Brief description of the drawings

FIG. 1 is a perspective view of a parachute pack provided with a ripcord constructed in accordance with the present invention;

FIG. 2 is a partial cross-sectional plan view of a release pin engaging a locking post;

FIG. 3 is a cross-sectional view of a release pin engaging a locking post taken on line 3—3 of FIG. 1;

FIG. 4 is a cross-sectional view of the ripcord taken on line 4—4 of FIG. 1; and FIG. 5 is a plan view of the bracket used to connect the ends of the two parallel cables to the single cable used for manual operation of the ripcord.

Description of the preferred embodiment

Referring to FIG. 1, a closed parachute pack 10 is shown with the ripcord 12 installed. The ripcord 12 generally includes a number of releasing pin assemblies 14 mounted on two parallel cables 16, a bracket 18 coupling one end of each cable 16 to a single cable 20, and a hand grip 22 for manually pulling the ripcord.

The releasing pin 14, as shown in detail in FIG. 2, generally comprises a U-shaped body 24 and locking pin 26. Locking pins 26 are adapted to fit into apertures 29 into cooperating locking posts or cones 30 projecting from the parachute pack 10. Each of the two sides 31 of the U-shaped body 24 has a hole 32 extending through it. The two holes 32 are parallel and are adapted to receive the two parallel cables 16. When the cables 16 are properly positioned in the U-shaped body 24, the chamfered ends 34 of the body 24 are crimped or swaged to permanently hold the cables 16 in place.

An end 38 of locking pin 26 is attached to the center 36 of the U-shaped body 24. Locking pin 26 can be attached to extend away from the body 24 as shown in FIG. 2 or to extend between the two sides 31. End 38 has an enlarged conical shape which is tapered generally toward the other end 40 of locking pin 26. A conical hole 42, adapted to cooperate with the enlarged end 38 of the locking pin 26, is cut through the center 36 of the U- shaped body 24. In completing the releasing pin assembly 14, end 40 of locking pin 26 is inserted through the conical hole 42 until the enlarged end 38 engages the conical hole 42. The enlarged end 38 is then welded or fixed to the U-shaped body 24. With this arrangement it is impossible to pull the locking pin 26 through hole 42 in the center 36 of the U-shaped body 24. Of course, other methods can be used for attaching the locking pin 26 to the U-shaped body 24 such as threading the end of pin 26 into a tapped hole extending through the body 24, but such methods are not as strong and reliable as the above described method.

Referring to FIGS. 1 and 3, the series of spaced locking posts 30 are connected to closure flap 44 of the parachute pack 10. The locking posts 30 may be stamped from thin, lightweight sheet metal. The canvas flap 44 is permanently clamped between flanges 46 and 48 on each locking post 30. A second closure flap 50 is fitted with spaced grommets 52 which cooperate with locking posts 30. In closing and locking the parachute pack 10, the second closure flap 50 is folded to overlap closure flap 44, each grommet 52 is inserted over a cooperating locking post 30, and the locking pins 26 are inserted through the apertures 29 of the locking posts 30. Springs within the parachute pack 10 exert a pressure tending to open the closure flaps 44 and 50. This pressure, which is exerted through the grommets 52 against the locking pins 26, holds each locking pin 26 within its cooperating aperture 29.

Referring now to FIGS. 1 and 4, an automatic parachute actuator 54 is mounted at end 56 of the parachute pack 10. The automatic actuator can be a commercially available unit, such as that described in Hallerberg Patent No. 2,953,063. A ring 58 is looped over the locking pin 26 of the first of the serially connected releasing pin assemblies 14. A cable 60 is attached at one end to the ring 58 and at the other end to a ball 62, which is engaged by the automatic actuator 54. When the automatic actuator 54 fires, a force is exerted on ball 62 and cable 60 transmits this force to ring 58 which simultaneously withdraws each locking pin 26 of the serially connected releasing pin assemblies 14 from its cooperating locking post 30. The locking pins 26 will be simultaneously released even though one of the two parallel cables 16 is badly frayed or broken.

Turning to FIGS. 1, 4 and 5, the ends 64 of the two parallel cables 16 nearest the first of the serially connected releasing pins 14 are terminated in a bracket 18. Bracket 18 has two hollow parallel sides 66 with chamfered ends 68 which are crimped or swaged to the ends 64 of the two parallel cables 16. A hole 70, through the center 72 of bracket 18, is adapted to receive a single cable 20. A ball 74, attached to end 76 of the single cable 20, exerts a force from cable 20 on bracket 18 when the hand grip 22 attached to end 78 of cable 20 is pulled. The force is transmitted from bracket 18 through the two parallel cables 16 to all of the releasing pins 14. Therefore, when hand grip 22 is pulled or when the automatic actuator 54 fires the locking pins 26 simultaneously disengage their cooperating locking posts 30.

It will be appreciated that by reason of the novel U-shaped body of the release pin assemblies, it is possible to have the locking pin disposed in the plane of, and parallel to, the two parallel cables. As a result, the ripcord actuating force is efficiently transmitted to the locking pin.

What I claim is:

1. In a parachute pack having a closure flap, a releasing pin adapted to hold the closure flap on an apertured locking post comprising: a generally U-shaped body having two side portions and a connecting center portion, an elongated locking pin attached to the center portion of said body, said pin being receivable in the aperture to lock the closure flap on the locking post, and means for attaching two releasing cables to the two side portions of said body whereby a pulling force on either releasing cable will disengage said locking pin from said locking post and release the closure flap.

2. In a parachute pack having a first closure flap with an attached apertured locking post adapted to receive a grommet which is attached to a second closure flap, an improved parachute release pin comprising: a U-shaped body having substantially parallel side portions and a connecting center portion, said side portions having parallel holes therethrough to receive two parallel release cables, an elongated locking pin received by the aperture in the locking post to lock the grommet onto the locking post, when in assembled relationship, and means connecting said locking pin to said center portion of said body.

3. The parachute release pin of claim 2 wherein said side portions are swaged on the release cables.

4. The parachute release pin of claim 2, wherein said center portion has a conical hole therethrough adapted to pass one end of said elongated locking pin, and said means connecting said locking pin to said center portion includes a short conical portion at the other end of said elongated locking pin which is tapered toward said one end of said locking pin, whereby when said one end of said elongated locking pin is inserted through the conical hole in said center portion, said conical portion engages said conical hole.

5. The parachute release pin of claim 4 wherein said conical portion is welded to said center portion.

6. In a parachute pack having closure flaps with attached grommets and apertured, spaced locking posts adapted to receive the grommets; an improved ripcord comprising, a cooperating release pin assembly for each locking post, said release pin assembly including a generally U-shaped body having two hollow, parallel side portions and a connecting center portion, and an elongated locking pin attached to said center portion, said locking pin being received by the aperture of said locking post to hold the grommets on the locking post, two parallel release cables extending through the two hollow, parallel side portions of said U-shaped bodies, and means attaching said release pin assemblies to said cables at the spacing of said spaced locking posts, whereby when either of said release cables is pulled the pins are withdrawn from said locking posts and the closure flaps are simultaneously released.

7. The ripcord of claim 6 including means connecting the ends of said two parallel release cables to a single release cable.

References Cited
UNITED STATES PATENTS
| | | | |
|---|---|---|---|
| 2,297,493 | 9/1942 | Nasca | 244—148 |
| 2,384,651 | 9/1945 | Smith | 244—149 |
| 2,845,241 | 7/1958 | Samms | 244—148 |

FOREIGN PATENTS
| | | |
|---|---|---|
| 1,148,890 | 7/1957 | France. |

MILTON BUCHLER, Primary Examiner

RICHARD A. DORNON, Assistant Examiner

U.S. Cl. X.R.

24—201, 205.18